UNITED STATES PATENT OFFICE.

ELLERSLIE E. LUTHER AND WILLIAM H. VOLCK, OF WATSONVILLE, CALIFORNIA.

PROCESS OF MAKING ARSENATE OF LEAD.

No. 892,603.  Specification of Letters Patent.  Patented July 7, 1908.

Application filed July 10, 1907. Serial No. 382,994.

To all whom it may concern:

Be it known that we, ELLERSLIE E. LUTHER and WILLIAM H. VOLCK, both citizens of the United States, residing at Watsonville, in the county of Santa Cruz and State of California, have invented new and useful Improvements in Processes of Making Arsenate of Lead, of which the following is a specification.

Our invention relates to an improved process for the preparation of arsenate of lead, and our process is carried out as follows: A combining weight of lead oxid (PbO) commonly termed litharge, is reacted upon by a combining weight of arsenic acid, the litharge being held in suspension in water, and the arsenic acid in solution, and the reaction is effected after a catalyzing agent has been added. This catalyzing agent may be either nitric acid or acetic acid. We have found that a preferable proportion is 1 to 3 pounds of the catalyzer to 100 pounds of the lead oxid. The product is arsenate of lead, slight traces of lead salts of the catalyzer, and the catalyzer.

The combining weight of arsenic acid may vary from the proportion one part of the anhydrid of arsenic acid to 1.938 parts of lead oxid, to a proportion of one part of the anhydrid of arsenic acid to 2.9 parts of lead oxid. The latter proportion will result in orthoarsenate of lead, with traces of pyroarsenate of lead, lead salts of the catalyzer, and the catalyzer. The first named proportion results in pyroarsenate of lead, with traces of orthoarsenate of lead, lead salts of the catalyzer, and the catalyzer. Proportions varying between the two will result in a mixture of the above named arsenates.

The reactions taking place when acetic acid is used as a catalyzer, are as follows: The formation of lead acetate is the first reaction:

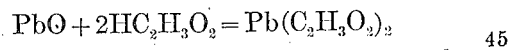

The formation of basic lead acetate is the next reaction

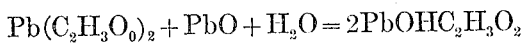

The formation of orthoarsenate of lead is the third reaction

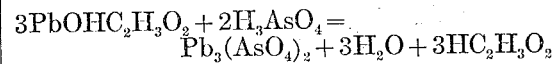

The free acetic acid now attacks more PbO and cycle begins again.

Having thus described our invention, what we claim and desire to secure by Letters Patent is—

The process of making arsenate of lead which consists in reacting upon lead oxid held in suspension in water with arsenic acid in the presence of a catalytic agent, the lead oxid and arsenic acid being used in the proportion of their combining weights.

In testimony whereof we have hereunto set our hands in presence of two subscribing witnesses.

ELLERSLIE E. LUTHER.
WILLIAM H. VOLCK.

Witnesses:
L. F. BUCKHART,
A. T. PORTER.